United States Patent [19]
Scattergood

[11] Patent Number: 5,789,353
[45] Date of Patent: Aug. 4, 1998

[54] DISPERSANTS

[75] Inventor: Roger Scattergood, Reading, England

[73] Assignee: Ethyl Petroleum Additives Limited, Bracknell, England

[21] Appl. No.: 840,520

[22] Filed: Apr. 21, 1997

[30] Foreign Application Priority Data

Apr. 19, 1996 [GB] United Kingdom ............. 9608142

[51] Int. Cl.$^6$ ................................. C10M 133/50
[52] U.S. Cl. .................. 508/191; 508/248; 508/250; 544/69; 544/106
[58] Field of Search ................... 508/248, 250, 508/291, 191

[56] References Cited

U.S. PATENT DOCUMENTS

| | | | |
|---|---|---|---|
| 4,101,433 | 7/1978 | Purcell et al. | 508/248 |
| 4,614,603 | 9/1986 | Wollenberg | 508/291 |
| 4,663,062 | 5/1987 | Wollenberg | 508/291 |
| 4,873,004 | 10/1989 | Beverwijk | 508/291 |
| 5,071,998 | 12/1991 | Wollenberg | 548/405 |

FOREIGN PATENT DOCUMENTS 2312212  10/1997  United Kingdom .

*Primary Examiner*—Jacqueline V. Howard
*Attorney, Agent, or Firm*—Dennis H. Rainear; Thomas Hamilton

[57] ABSTRACT

An oil-soluble dispersant obtainable by reacting a polyalkenyl succinic acylating agent and N-(2-(4-morphinyl)ethyl)-1,2-ethane diamine.

11 Claims, No Drawings

DISPERSANTS

This invention relates to dispersants useful as additives in lubricating oils, especially lubricating oils for gasoline engines and vehicles driven by such engines. More particularly, the present invention provides novel ashless dispersants which exhibit excellent dispersancy and which have reduced reactivity towards fluoroelastomers.

A continuing problem in the art of lubrication is to provide lubricant compositions which meet the requirements of original equipment manufacturers. One such requirement is that the lubricant does not cause or contribute to premature deterioration of seals, clutch face plates or other parts made from fluoroelastomers. Many currently used dispersants contain basic nitrogen, and it is known that such dispersants, including more particularly the commonly used succinimide dispersants, tend to have an adverse effect upon fluoroelastomers which causes them to lose flexibility and tensile strength, to become brittle, and, in severe cases, to disintegrate. Standard test methods for evaluating fluoroelastomer compatibility of lubricant compositions include the Volkswagen PV-3344 Seal Test and the ACEA Viton Seal Test (CEC L-39-T-87 oil/elastomer compatibility test). Of these, the PV-3344 test is a more severe fluoroelastomer compatibility test. Commercially available premium dispersant-containing gasoline oils typically require the use of post-treated dispersants to meet the requirements of the PV-3344 test. However, post-treatment leads to an increase in the time taken to prepare the dispersant as well as increasing the overall cost. There is therefore a need for novel dispersants which do not require post-treatment to satisfy current requirements for compatibility with fluoroelastomers while at the same time meeting the other requirements for ashless dispersants to be used in lubricant oils.

Accordingly, the present invention provides an oil-soluble dispersant obtainable by reacting a polyalkenyl succinic acylating agent and N-(2-(4-morphinyl)ethyl)-1,2-ethane diamine (MEED).

Polyalkenes which may be used in making the succinic acylating agent are described for example in EP-A-0460309 and U.S. Pat. No. 4,234,435. The polyalkene is typically one having a number average molecular weight of between 900 and 5000 and preferably between 1300 and 2100. Polyalkenes having a number average molecular weight of about 2100 are especially preferred.

Specific examples of polyalkenes which may be used include polypropylenes, polybutenes, ethylene-propylene copolymers, styrene-isobutene copolymers, isobutene-1,3-butadiene copolymers, propene-isoprene copolymers, isobutene-chloroprene copolymers, isobutene-4-methylstyrene copolymers, copolymers of 1-hexene with 1,3-hexadiene, copolymers of 1-octene with 1-hexene, copolymers of 1-heptene with 1-pentene, copolymers of 3-methyl-1-butene with 1-octene, copolymers of 3,3-dimethyl-1-pentene with 1-hexene, and terpolymers of isobutene, styrene and piperylene. More specific examples of such interpolymers include a copolymer of 95% (by weight) of isobutene with 5% (by weight) of styrene, terpolymer of 98% of isobutene with 1% of piperylene and 1% of chloroprene, terpolymer of 95% of isobutene with 2% of 1-butene and 3% of 1-hexene, terpolymer of 60% of isobutene with 20% of 1-pentene and 20% of 1-octene, copolymer of 80% of 1-hexene and 20% of 1-heptene, terpolymer of 90% of isobutene with 2% of cyclohexene and 8% of propylene, and copolymer of 80% of ethylene and 20% of propylene. Preferred sources of polyalkenes are the polyisobutenes, such as those obtained by polymerisation of C$_4$ refinery streams which contain both n-butene and isobutene in various proportions using a Lewis acid catalyst such as aluminum trichloride or boron trifluoride. These polybutenes usually contain predominantly (for example, greater than about 80% of the total repeating units) of repeating units of the configuration

In forming the polyalkenyl succinic acylating agent the polyalkene is reacted with an unsaturated acid, i.e. monomer or derivative thereof which is responsible for the presence of acidic groups in the acylating agent. Such unsaturated acids and their derivatives may be represented by the formula:

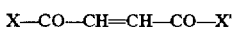

in which X and X' are such that at least one of them is capable of reacting with a polyamine. These acids are described in greater detail in EP-A-0460309. Especially preferred acids which may be used include maleic and fumaric acids and their derivatives, particularly their anhydrides. The preparation of polyalkenyl succinic acylating agents as used in the present invention is well known in the art, for example from U.S. Pat. No. 3,912,764 and U.S. Pat. No. 3,215,707.

According to a preferred feature of the invention the polyalkenyl succinic acylating agent is polyisobutenyl succinic anhydride.

MEED may be made by known methods.

In the reaction the mole ratio of succinic acylating agent to MEED is typically 1.3:1 to 3:1, but preferably 1.3:1 to 2:1.

The ashless dispersants of the invention may be prepared by reacting the polyalkenyl succinic acylating agent and MEED in the desired mole ratio at a temperature in the range of 140° to 190° C. However, it is preferable to carry out the reaction at a temperature of between 150° and 170° C. Generally, the reaction is complete within 3 to 4 hours.

It is possible to use the reaction product as is though in an embodiment of the invention the reaction product is post-treated, in known manner, with a boronating agent and/or an acylating agent. Suitable post-treating agents are known in the art. Here reference may be made, for example, to U.S. Pat. No. 5,241,003 and the United States Patents referred to therein, to U.S. Pat. No. 4,857,214 and U.S. Pat. No. 5,164,103 and to EP-A-0460309. Post-treatment may be performed simultaneously or consecutively with the chosen post-treatment agents.

A wide variety of dibasic and polybasic acylating agents may be used in the practice of the invention. The acylating agent typically contains up to 40, preferably up to 12, and more preferably still up to 8, carbon atoms. Use may be made of di- or poly-basic acids, anhydrides, esters and acyl halides thereof.

Examples of dibasic acylating agents which may be used include azelaic acid, adipic acid, succinic acid, lower alkyl-substituted succinic acid, succinic anhydride, lower alkyl-substituted succinic anhydride glutaric acid, pimelic acid, suberic acid, sebacic acid, maleic acid, maleic anhydride, fumaric acid and malic acid, and like dibasic acids, anhydrides, acyl halides and esters. Of these, the most preferred is maleic anhydride.

Examples of polybasic acylating agents which may be used are given in U.S. Pat. No. 4,548,724 and include, more particularly, citric acid and 1,3,6,-hexane tricarboxylic acid.

Boronation may be accomplished using a boron compound or mixture of boron compounds capable of introducing boron-containing species into the dispersant undergoing the reaction. Any boron compound, organic or inorganic, capable of undergoing such reaction can be used. Accordingly use can be made of boron oxide, boron oxide hydrate, boron trifluoride, boron tribromide, boron trichloride, $HBF_4$, boron acids such as boronic acid (e.g. alkyl-$B(OH)_2$ or aryl-$B(OH)_2$), boric acid (i.e. $H_3BO_3$), tetraboric acid (i.e. $H_2B_5O_7$), metaboric acid (i.e. $HBO_2$), ammonium salts of boron acids, and esters of such boron acids. The use of complexes of a boron trihalide with ethers, organic acids, inorganic acids, or hydrocarbons is a convenient means of introducing the boron reactant into the reaction mixture. Such complexes are known and are exemplified by boron trifluoride-diethyl ether, boron trifluoride-phenol, boron trifluoride-phosphoric acid, boron trichloride-chloroacetic acid, boron tribromide-dioxane, and boron trifluoride-methyl ethyl ether. The use of boric acid is preferred.

According to an embodiment of the invention, the oil-soluble dispersant may be provided in the form of an additive concentrate. Typically, the concentrate comprises the oil-soluble dispersant of the invention in combination with a diluent oil and/or other liquid inert diluent(s). Such concentrates typically comprise from 1 to 99% by weight of diluent oil and/or inert diluent and from 99 to 1% by weight of dispersant.

The invention also includes within its scope compositions, especially lubricant compositions, comprising an oil of lubricating viscosity and a dispersant as described above. The dispersant can be used in a wide variety of conventionally used lubricating oils. The concentration at which the dispersant is used generally falls in the range of up to about 10% by weight, for example 1 to 9% by weight. Amounts of up to about 2 to 7% by weight are preferred.

The concentrates and lubricant compositions of the invention typically contain other additives commonly found in lubricant formulations. Such additives include viscosity index improvers, antiwear agents, antioxidants, rust inhibitors, antifoams and color stabilizers. Of course, these additives are only used provided they are compatible with the dispersants of the present invention and the other component(s) used. When present the other additive(s) are used in conventional amounts.

A further embodiment of the invention is the use of the above described dispersants in a lubricant composition for lubricating an engine, e.g. a gasoline engine, or other device. As noted above, the dispersants of the invention show a remarkably reduced tendency to degrade or otherwise adversely effect fluoroelastomers. Such lubricant composition is thus particularly suitable when in use it comes into contact with a fluoroelastomer.

The following examples illustrate the present invention.

EXAMPLE 1

An oil solution was prepared from 100SN oil and polyisobutenylsuccinic anhydride (PIBSA). The PIBSA was obtained from polyisobutylene with a number average molecular weight of 2100. The solution had a mass of 500 g and contained 0.148mole PIBSA. The oil solution was stirred and heated to 167° C. and a vacuum applied. N-(2-(4-morpholinyl)ethyl-1,2-ethane diamine (MEED) (12.76 g; 0.074 mole) was added over approximately 30 minutes. After the amine addition was complete the mixture was stirred for 3 hours and the vacuum released. 100SN process oil (170g) was added and the mixture stirred for a further 15 minutes. The product after filtering contained 0.52% Nitrogen.

EXAMPLE 2

PIBSA prepared from polyisobutylene with a number average molecular weight of 2100 (1000 g; 0.36 mole) was stirred and heated to 167° C. and a vacuum applied. MEED (38.9 g; 0.225 mole) was added over approximately 30 minutes. After the amine addition was complete the mixture was stirred for 3 hours and the vacuum released. Maleic anhydride (MA) (8.8 g; 0.09 mole) was then added and the mixture stirred for a further 15 minutes. After stripping under vacuum for 30 minutes, 100SN process oil (768 g) was added and the mixture stirred for a further 15 minutes. The product after filtering contained 0.48% Nitrogen.

EXAMPLE 3

PIBSA prepared from polyisobutylene with a number average molecular weight of 2100 (1000 g; 0.36 mole) was stirred and heated to 167° C. and a vacuum applied. MEED (34.6 g; 0.20 mole) was added over approximately 30 minutes. After the amine addition was complete the mixture was stirred for 3 hours and the vacuum released. 100 SN process oil (759 g) was added and the mixture stirred for a further 15 minutes The product after filtering contained 0.52% Nitrogen.

EXAMPLE 4

Example 3 was repeated except that the charge of MEED was 38.9g (0.225mole) and the charge of process oil was 977g. The product after filtering contained 0.48% Nitrogen.

EXAMPLE 5

Example 3 was repeated except that charges of PIBSA (500 g; 0.18 mole), MEED (22.1 g; 0.128 mole) and process oil (490 g) were used. The product contained 0.53% Nitrogen.

EXAMPLE 6

PIBSA prepared from polyisobutylene with a number average molecular weight of 2100 (400 g; 0.144 mole) was stirred and heated to 167° C. and a vacuum applied. MEED (20.76 g; 0.12 mole) was added over approximately 30 minutes and the mixture stirred for 3 hours. The vacuum was released and after the temperature had been adjusted to 150° C., boric acid (BA) (24.34 g; 0.39 mole) was added. The mixture was stirred for an hour and then maleic anhydride (MA) (2.35 g; 0.024 mole) was added. The mixture was stirred for a further 15 minutes and then the water of reaction was removed by applying a vacuum of 100 mm of Hg for one hour. The vacuum was then released and 100SN process oil (392 g) charged. The product after filtering contained 0.58% Nitrogen and 0.45% Boron.

EXAMPLE 7

Example 5 was repeated except that the MEED charge was 24.0 g (0.139 mole). The product contained 0.56% Nitrogen.

EXAMPLE 8

PIBSA prepared from polyisobutylene with a number average molecular weight of 2100 (400 g; 0.144 mole) was stirred and heated to 167° C. and a vacuum applied. MEED (17.77 g; 0.103 mole) was added over approximately 30 minutes. After the amine addition was complete the mixture was stirred for 3 hours and the vacuum released. The temperature was reduced to 150° C., boric acid (BA) (24.3 g; 0.39 mole) added and the mixture stirred for a further hour. After stripping under vacuum for one hour, 100SN process oil (392 g) was added and the mixture stirred for a further 15 minutes The product after filtering contained 0.51% Nitrogen and 0.49% Boron.

EXAMPLE 9

The procedure of Example 2 was repeated with the following charges:

| PIBSA | 500 g (0.18 mole) |
| --- | --- |
| MEED | 24.0 g (0.139 mole) |
| Maleic Anhydride | 2.72 g (0.028 mole) |
| Process Oil | 487 g |

The product contained 0.54% Nitrogen.

The product of each example was blended into a standard 15W-40 engine oil formulation from which the conventional ashless dispersant had been omitted. The dispersant was used at a concentration in the finished lubricant of 7 wt % (including the diluent oil associated with the dispersant). The finished lubricant was thus made up by weight of 72.4% 150 SN mineral oil, 5.0% 500 SN mineral oil, 9.7% OCP viscosity index improver, 1.31% zinc dialkyl dithiophosphate, 2.6% overbased calcium sulfonate, 0.64% low base calcium sulfonate, 0.8% phenolic antioxidant, 0.25% aromatic amine antioxidant, 0.004% antifoam agent, 0.296% process oil, and 7% of dispersant under test, the proportions of the additive components being on an as received basis. The lubricant was subject to the Volkswagen PV-3344 Seal Test. A pass in this test corresponds to a minimum elongation (EL) of 160%, a minimum tensile strength (TS) of 8.0 MPa and no seal cracking.

The results obtained are reported in the table below.

| PV 3344 RESULTS | | | | |
| --- | --- | --- | --- | --- |
| | MOLE RATIO PIBSA:MEED:MA:BA | EL(%) | TS (MPa) | CRACKING? |
| Example 1 | 2.0:1:0:0 | 202 | 10.4 | No |
| Example 2 | 1.6:1:0.4:0 | 234 | 9.5 | No |
| Example 3 | 1.8:1:0:0 | 223 | 9.2 | No |
| Example 4 | 1.6:1:0:0 | 223 | 9.2 | No |
| Example 5 | 1.4:1:0:0 | 176 | 8.6 | No |
| Example 6 | 1.2:1:0.2:3.25 | 160 | 8.8 | No |
| Example 7 | 1.3:1:0:0 | 160 | 8.0 | No |
| Example 8 | 1.4:1:0:3.79 | 178 | 9.6 | No |
| Example 9 | 1.3:1:0.2:0 | 186 | 10.0 | No |

As can be seen from these results, dispersants in accordance with the present invention yield a pass result in the PV 3344 test. The results for Examples 1, 3, 4, 5 and 7 are particularly significant. The dispersants of these examples give a pass result without the need for any post-treatment. Conventional dispersants usually require post-treatment to impart the necessary degree of seal compatibility.

I claim:

1. An oil-soluble dispersant obtained by reacting a polyalkenyl succinic acylating agent and N-(2-(4-morphinyl) ethyl)-1,2-ethane diamine.

2. The dispersant of claim 1 wherein the succinic acylating agent is derived from a polyalkylene having a number average molecular weight of between 900 and 5000.

3. The dispersant of claim 2 wherein the succinic acylating agent is derived from a polyalkylene having a number average molecular weight of between 1300 and 2100.

4. The dispersant of claim 3 wherein the polyalkenyl succinic acylating agent is polyisobutenyl succinic anhydride.

5. The dispersant of claim 4 wherein the mole ratio of polyalkenyl succinic acylating agent reacted with N-(2-(4-morphinyl)ethyl)-1,2-ethane diamine is from 1.3:1 to 3:1.

6. The dispersant of claim 5 wherein the mole ratio is from 1.3:1 to 2:1.

7. The dispersant of claim 1 wherein the dispersant is post-treated with a boronating agent and/or acylating agent.

8. An additive concentrate comprising the oil-soluble dispersant of claim 1.

9. A lubricating composition comprising an oil of lubricating viscosity and the oil-soluble dispersant of claim 1.

10. A process for preparing an oil-soluble dispersant which comprises combining a polyalkenyl succinic acylating agent and N-(2-(4-morphinyl)ethyl)-1,2-ethane diamine at a temperature in the range of 140° to 190° C. and a mole ratio of acylating agent to N-(2-(4-morphinyl)ethyl)-1,2-ethane diamine of from 1.3:1 to 3:1.

11. The process of claim 10 further comprising boronating and/or acylating the reaction product obtained.

* * * * *